United States Patent [19]
Baldwin et al.

[11] Patent Number: 5,139,226
[45] Date of Patent: Aug. 18, 1992

[54] ELECTRO-MECHANICAL FLUID CONTROL VALVE

[75] Inventors: David L. Baldwin, Denver; Steven D. Kaplan, Littleton, both of Colo.

[73] Assignee: Mechanical Systems Analysis, Inc., Littleton, Colo.

[21] Appl. No.: 704,051

[22] Filed: May 22, 1991

Related U.S. Application Data

[63] Continuation of Ser. No. 546,421, Jun. 29, 1990, abandoned.

[51] Int. Cl.⁵ .................... F16K 31/06; F16K 11/044
[52] U.S. Cl. ............................ 251/129.2; 251/129.17; 137/625.44; 137/625.65
[58] Field of Search ........... 251/129.2, 129.15, 129.17, 251/129.09; 137/625.44, 625.65

[56] References Cited

U.S. PATENT DOCUMENTS

| | | | |
|---|---|---|---|
| 1,767,058 | 6/1930 | Eiseman | 251/129.2 X |
| 1,879,165 | 9/1932 | French | 251/129.2 |
| 1,883,957 | 10/1932 | Koch et al. | 251/129.2 |
| 1,964,281 | 6/1934 | Young et al. | 251/129.2 X |
| 2,245,834 | 6/1941 | Sparrow | 251/129.2 X |
| 2,570,593 | 10/1951 | Ray | 251/129.2 X |
| 3,210,041 | 10/1965 | Mitts | 251/129.2 |
| 4,170,339 | 10/1979 | Ueda et al. | 251/129.2 |
| 4,562,866 | 1/1986 | Nicolas et al. | 251/129.2 X |
| 4,889,314 | 12/1989 | Hashizume et al. | 251/129.2 X |
| 5,048,564 | 9/1991 | Gaiardo | 251/129.2 X |

*Primary Examiner*—John Rivell
*Attorney, Agent, or Firm*—Fields, Lewis, Pittenger & Rost

[57] ABSTRACT

Electromagnetic fluid control valves disclosed have a valve body with at least two ports through which a fluid is passed in flowing therethrough with at least one port being closable. Electromagnetic actuating means includes an elongated magnetic core with spaced, opposed first and second leg portions and an intermediate connecting leg portion. One of the first and second leg portions terminates in an end face. A coil wound on the core produces magnetic flux therein. An armature of minimum mass spans the end portions of the first and second leg portions of the core and provides a face opposite the end face of the core to define an open unobstructed air gap. A spring bias is employed to maintain the air gap at its maximum length when the valve is in the deenergized state. The length of the air gap is sized in relation to the diameter of the closable port to maximize the force across the air gap and minimize the travel distance of the armature, thus facilitating maximum switching speed without restricting fluid flow when in the open-port position.

21 Claims, 3 Drawing Sheets

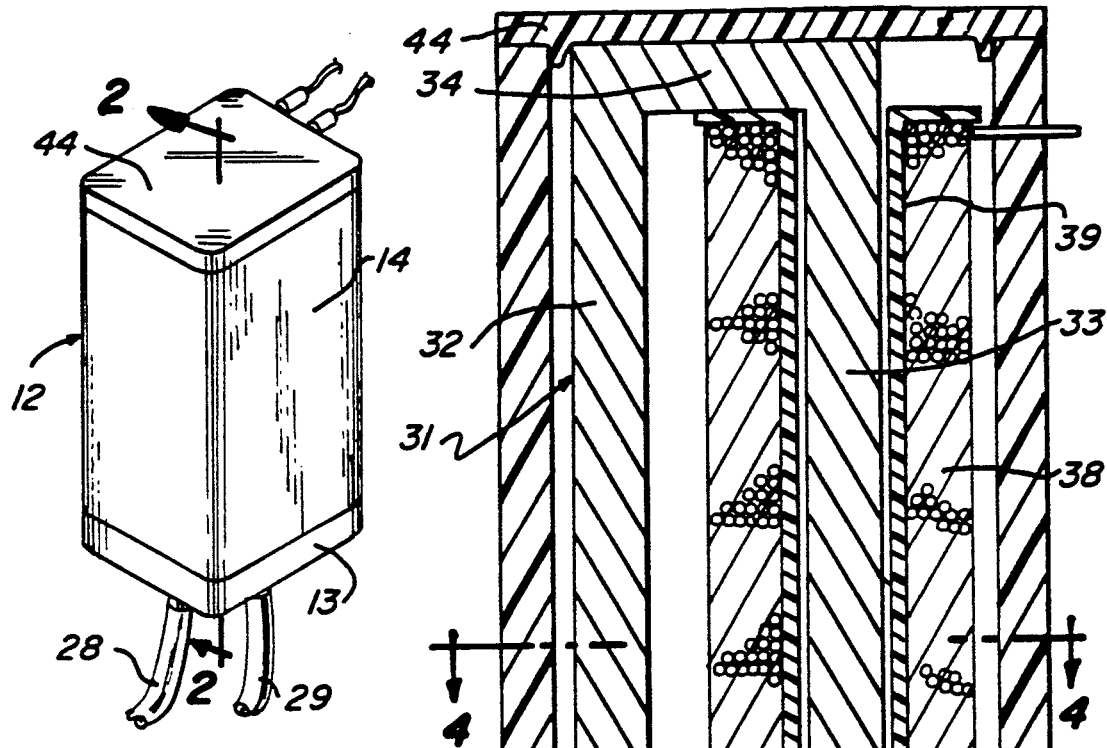
Fig_1
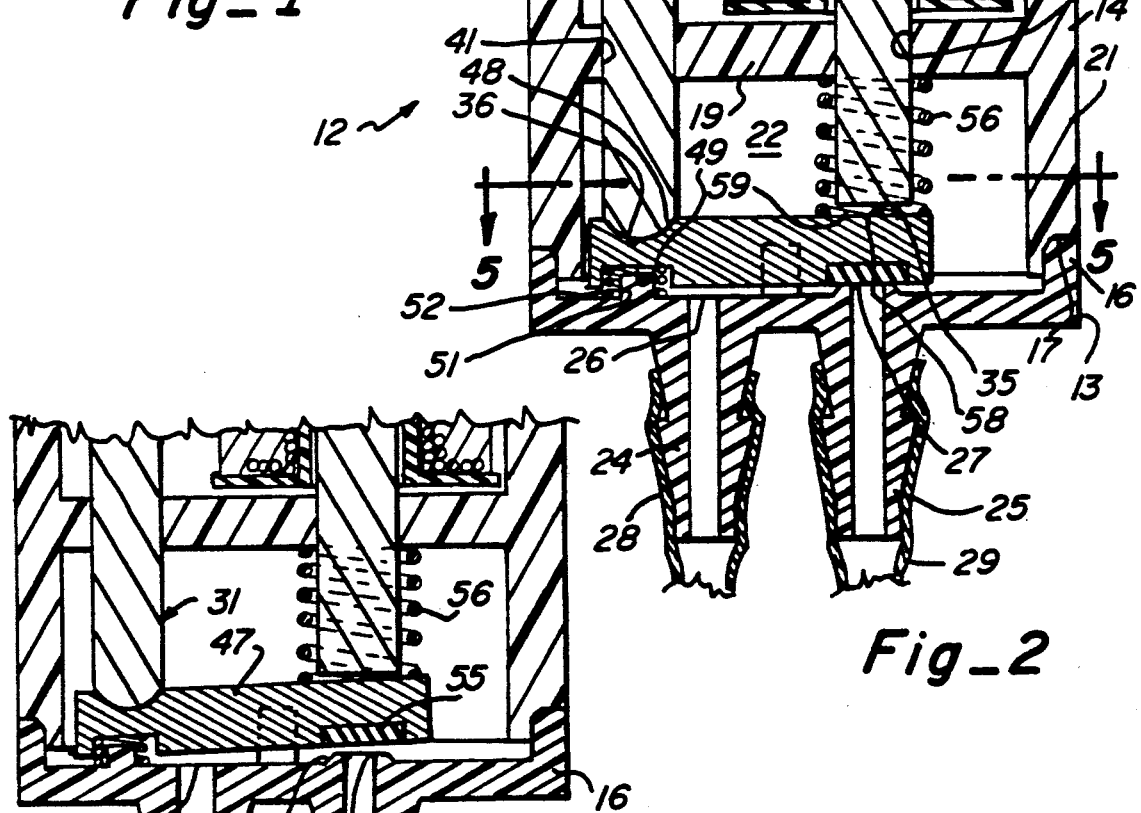
Fig_2
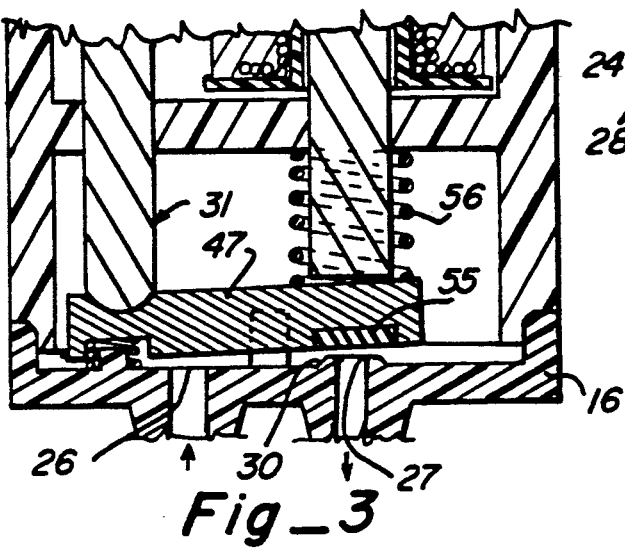
Fig_3

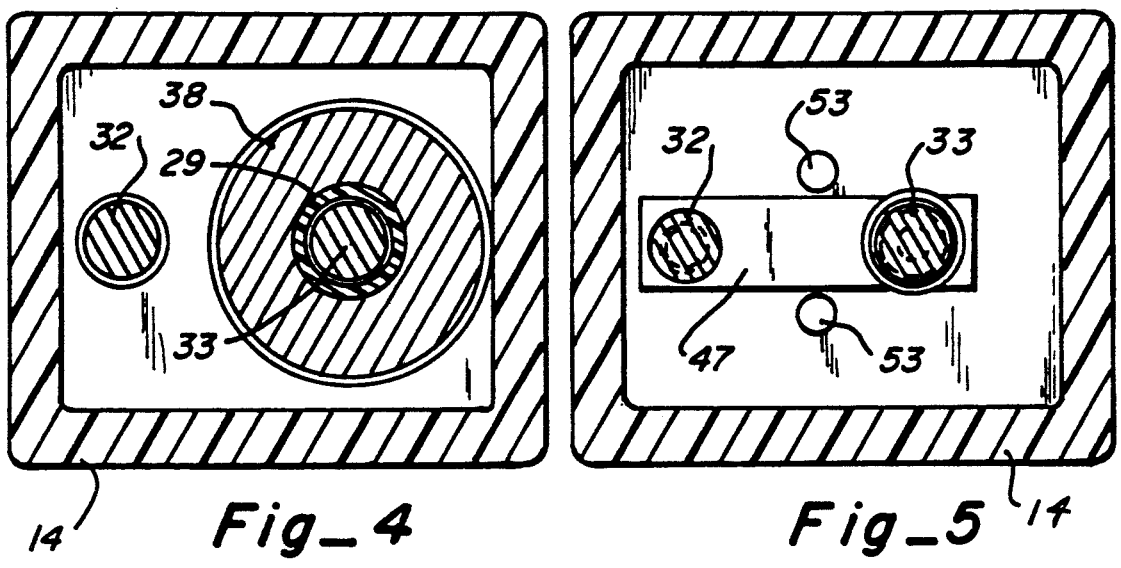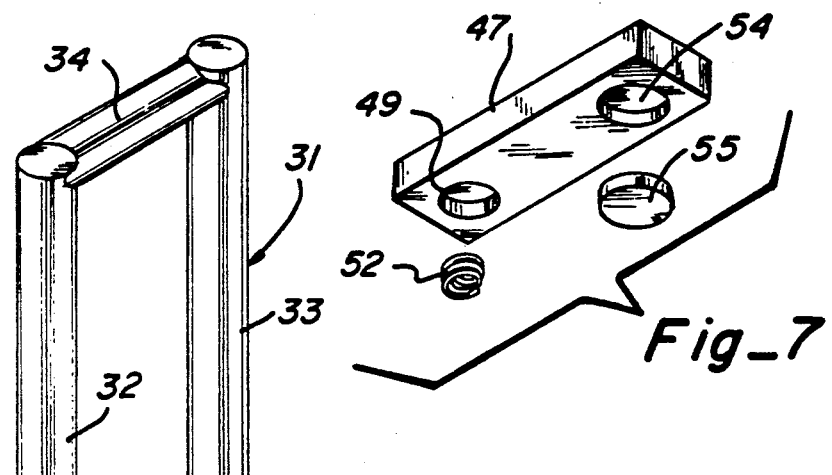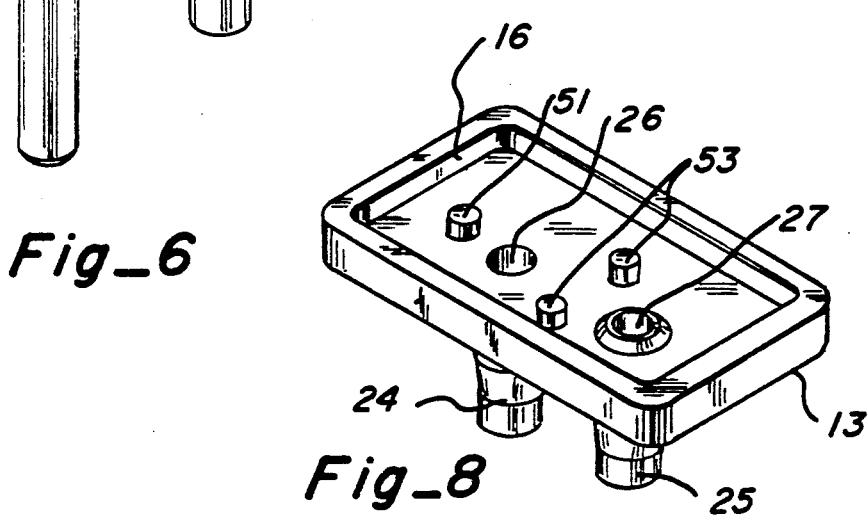

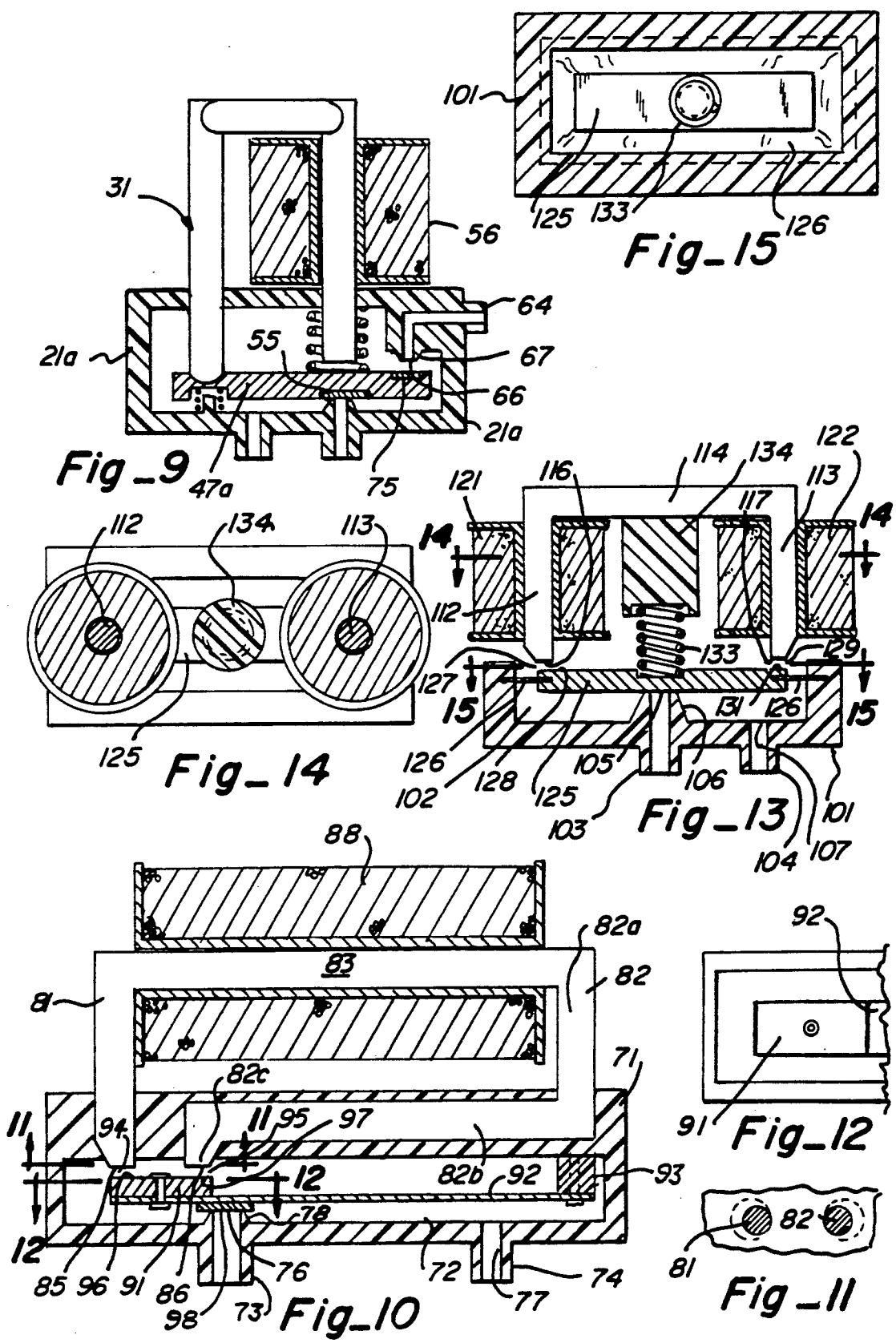

ELECTRO-MECHANICAL FLUID CONTROL VALVE

This application is a continuation of application Ser. No. 546,421, now abandoned filed Jun. 29, 1990.

TECHNICAL FIELD

This invention relates to fluid control devices and more particularly to a novel and improved electromagnetic fluid control valve.

BACKGROUND ART

Electromagnetically actuated fluid control valves, particularly relatively small valves of this type, have widespread use in the application of fluid control. Some examples of applications for this type of valve are for ink jet printing, dye patterning on textile substrates, and precision fluid control in medical and HVAC applications. The most common type of fluid control valve presently in use is a solenoid valve which includes a high permeability straight core with a centrally disposed air gap and a coil wrapped around the core. The disadvantage of this type is that the closed lines of flux must pass through the low permeability space outside of the coil which adversely affects the development of force across the air gap.

German Pat. No. 24 40 565 discloses a nozzle flap valve in which a core, yoke and flap form a magnetic circuit. A nozzle pipe extends through the magnetic core and into the air gap so the air gap is obstructed and the magnetic flux is not closely confined and further there are several interruptions in the loop of the magnetic circuit.

Fischer et al. U.S. Pat. No. 4,196,751, Morris U.S. Pat. No. 4,759,528, Nanbu et al. U.S. Pat. No. 4,848,727 and Iljin U.S. Pat. No. 4,905,962 disclose pot cores in which the coil is wound on a central leg and includes flux in a circular outer path and back to the center leg which is a magnetic path of non-uniform cross-section. These types of solenoid designs result in the uniform dispersion of flux lines as they pass from the solenoid core into the permeable material surrounding the coil. The armature must be of equal diameter to the permeable material outside of the coil in order to complete the magnetic path. This results in a greater armature mass, and consequently a slower switching speed, for a given force, than could be obtained if the armature's size was directly related to the cross sectional area of the solenoid core.

Holloman U.S. Pat. No. 3,589,672 discloses an armature carried on a resilient non-magnetic strip and actuated by coils on a pair of parallel legs of a U-shaped core.

DISCLOSURE OF THE INVENTION

An electromagnetic fluid control valve disclosed includes a valve body with an inner cavity and at least two ports through which a fluid is selectively passed in passing fluid through the valve body. An electromagnetic actuator controls the fluid flow through the ports which includes an elongated magnetic core having two parallel, spaced, opposite leg portions, a coil to produce magnetic flux in the core and a movable magnetic armature spanning the ends of the leg portions of the core. The armature moves between two positions. The cross sectional areas of the core and armature are selected to efficiently confine the lines of flux in a minimum amount of material. The resulting high flux density serves to maximize the force applied to the armature and minimize the mass of the armature which, in turn, maximizes the speed of the armature. The shape of the face on the armature at least conforms in size and shape with the substantially parallel opposite core face to provide substantially uniform flux density in an air gap between the two faces. The length of the air gap is selected to maximize the switching speed of the valve by optimizing the force exerted on the armature at the air gap by minimizing the distance the armature must travel between the no fluid flow and unrestricted fluid flow positions. The force produced across the air gap by the energized coil overcomes a spring bias. The spring is sized to return the armature to the maximum air gap position in a minimal amount of time when the coil is deenergized. The magnetic and spring forces acting on the armature are so high relative to fluid forces as to make the effect of any fluid forces acting on the armature negligible, thus yielding consistent and predictable opening and closing times and making the valve suitable for a wide range of fluid pressures. One embodiment disclosed has a single air gap and two further embodiments disclosed have two air gaps.

BRIEF DESCRIPTION OF THE DRAWINGS

Details of this invention are described in connection with the accompanying drawings which like parts bear similar reference numerals in which:

FIG. 1 is a perspective view of an electromagnetic fluid control valve embodying features of the present invention.

FIG. 2 is a sectional view taken along lines 2—2 of FIG. 1 with the armature shown in the port-closed position.

FIG. 3 is a fragmentary sectional view taken along the same lines as FIG. 2 with the armature shown in the port-open position.

FIG. 4 is a sectional view taken line 4—4 of FIG. 2.

FIG. 5 is a sectional view taken along line 5—5 of FIG. 2.

FIG. 6 is a perspective view of the magnetic core.

FIG. 7 is a perspective view of the armature with the coil spring and resilient pad removed.

FIG. 8 is a top perspective view of the base portion of the valve shown in FIG. 1.

FIG. 9 is a sectional view showing the two port outlet valves with one position open and one closed.

FIG. 10 is an alternative embodiment of a control valve embodying features of the present invention.

FIG. 11 is a sectional view taken along line 11—11 of FIG. 10.

FIG. 12 is a sectional view taken along line 12—12 of FIG. 10.

FIG. 13 is another alternate embodiment of a valve embodying features of the present invention.

FIG. 14 is a sectional view taken along line 14—14 of FIG. 13.

FIG. 15 is a sectional view taken along line 15—15 of FIG. 13.

DETAILED DESCRIPTION

Referring now to the drawings there is shown in FIGS. 1-8 an electromagnetic fluid control valve 12 embodying features of the present invention. Valve 12 shown includes a lower base 13 and an upper housing 14 mounted on the base. The base 13 has upturned outer sidewall portions 16 and the lower edge of the housing 14 has a step 17 which allows the housing 14 to slide fit into the base 13 at the lower end of the housing.

The housing 14 has an intermediate transverse wall portion 19 opposite and spaced from the base so that when the base and housing are fitted together they define a valve body 21 with an inner cavity 22. The base 13 has two flow pipe portions 24 and 25 projecting out therefrom which along the inside of the base form a normally-open port 26 and a normally-closed port 27. It is understood that the two ports according to the present invention control flow through the body and may have either a closed or open state and are herein also referred to as a first port and second port. The external surfaces of the pipe portions 24 and 25 are tapered to hold flexible flow lines 28 and 29, respectively, to conduct fluid into and out of the device. The normally-closed port 27 is defined by a raised, beveled surface portion forming a port seat 30 on the inside of the base which seat is an extension of pipe portion 25.

A generally U-shaped elongated magnetic core 31 is mounted in the housing 14. This core has two parallel-spaced, oppositely disposed leg portions 32 and 33 and an intermediate portion 34 which connects the two leg portions together at adjacent ends and extends transverse thereto. The core shown has a circular transverse cross section and the cross section shown is substantially uniform throughout its length. Leg portion 33 terminates in a flat end face 35 that is circular in shape. Leg portion 32 terminates in an arcuate end face 36 that provides one part of a hinge joint for the armature described hereinafter. The cross sectional area of end face 35 is selected to maximize the force applied to the armature and minimize the mass of the armature 47 which, in turn, maximizes the speed of the armature as is described more fully hereinafter.

A coil 38 is wrapped around leg portion 33. In particular, the coil is wrapped on a bobbin-type spool 39 which, in turn, telescopes over the core leg portion 33. The coil 38 has two modes of operation. One mode is when the coil is energized to produce a magnetic flux in the core and the other mode is when the coil is not energized and no flux is produced. The two modes for the coil are herein generally referred to as a first coil mode and a second coil mode. The leg portions of the core insert through two spaced holes 41 and 42 in the wall portion 19 and end portions thereof extend into the lower cavity 22. The core is permanently affixed to the housing. This may be done by securing means such as adhesives or ultrasonic welding. It is understood that other forms of mountings for the core in the housing may be used. A removable cover 44 closes the top of the housing after the core has been inserted into place in the housing 14 as shown.

A magnetic armature 47 extends between or spans the ends of the two leg portions of the core. The armature 47 shown is of an elongated generally rectangular shape. Armature 47 has an arcuate recess 48 in the top face at one end complimentary in shape with the arcuate end portion 36 of the core whereby a hinge joint is formed between the two so that the armature will freely pivot between two operating positions discussed hereinafter. The armature further has a circular recess 49 in the bottom face opposite recess 48 into which a projection 51 on the base extends. A coil spring 52 telescopes on projection 51 and extends into recess 49 to resiliently urge and therefore bias the two arcuate surfaces 36 and 48 together at the hinge joint for the armature. A pair of upstanding circular projections 53 on the base are in close proximity to the sides of the armature to limit movement from side to side. It is understood that other forms of hinge joints could be used. The one shown features an approximate fifty percent reduction in the effective moveable mass, a low reluctance path between the armature and the magnetic core, a low friction joint, and extended life.

The armature further has a recess 54 in the bottom face at the free end that receives a resilient disk 55. Disk 55 is resiliently urged or biased against the port seat 30 by a coil spring 56 that telescopes over the end of the leg 33 and bears against wall portion 19 and the top surface of the armature as shown in FIG. 2.

The end face 35 and the opposite face 58 on the armature form an air gap 59. The air gap is in the flux path and its length is preferably one-fourth of the diameter of the normally-closed port 27 to maximize the force (high force) across the air gap with a minimum of travel distance of the armature, while not restricting fluid flow when the armature has fully reached the port-open position. Further, the end face 35 is circular and the opposite face is rectangular but the opposite face is at least of the same or conforming cross sectional area so as to provide high permeability interfaces perpendicular to the direction of magnetic flux flow at both ends of the air gap. The cross sectional areas of the two opposite faces defining the air gap through which the flux passes are designed to produce high flux density so as to minimize the mass of the armature. The term high flux density as referred to herein means a relatively high number of magnetic flux lines contained within a minimum cross sectional area of material without driving the material deep into saturation on the B-H curve. The armature is operated at a high flux density level. Further, the high flux density across the air gap works to maximize the force (high force) applied to moving the armature. Maximizing the force and minimizing both the armature mass and air gap length results in minimum armature travel time and hence, reduced valve cycle time.

When the coil 38 is energized by a suitable electric power source, magnetic flux flows through the core 31 and armature 47 and across the air gap 59 and the armature is now moved to a port-open position wherein the two faces 35 and 58 abut or come in contact with one another and the port seat 30 is uncovered so that the fluid flow will pass through the two conduits and two ports. In the arrangement shown, the fluid flow is in pipe portion 24 and through port 26 and then port 27 and then out pipe portion 25 as shown by arrows. When the electric power is removed from the coil, the spring 56 moves the armature 47 back to the port-closed position to close off fluid flow through the valve body 21. The two positions for the armature may also be reversed i.e. initially port-closed and then port-open. The two positions for the armature are herein generally referred to as the first armature position and the second armature position.

Referring now to FIG. 9, the modified valve shown has a valve body 21a with a third flow pipe portion 64 and a second normally-open outlet port 66 defined by a raised beveled surface forming a port seat 67 on the inside of the body 21a. A modified armature 47a is of greater length and carries a second resilient disk 75 recessed in the top face of the armature 47a. The second disk 75 moves against the port seat 67 to close the second outlet port and open the first outlet port when the coil is energized.

Another embodiment of the present invention shown in FIGS. 10, 11 and 12 includes a valve body 71 with an inner cavity 72 and two flow pipe portions 73 and 74 projecting out therefrom. Pipe portion 73 forms a normally-closed port 76 and pipe portion 74 forms a normally-open port 77. The port portion 73 is defined by a raised, beveled port seat 78.

The elongated magnetic core has two spaced, oppositely disposed leg portions 81 and 82 and an intermediate leg portion 83 which connects the two spaced leg portions 81 and 82 together and extends generally transverse thereto. Leg portion 81 terminates in an end face 85 and leg portion 82 in an end face 86. Leg portion 82 further has a first section 82a parallel to leg portion 81, second section 82b transverse to leg portion 81 and a third section 82c parallel to leg portion 81. The end face 86 is at the end of third section 82c. A coil 88 is wrapped around the intermediate portion 83.

A magnetic armature 91 is mounted on a movable non-magnetic leaf spring 92 secured at one end in a cantilever-type support 93 at one end of the inside of the valve body 71 to move the armature to a port-open position when the coil is energized. A first air gap 94 is formed between end face 85 and an opposite face 96 of the armature and a second air gap 95 is formed between end face 86 and an opposite face 97 of the armature. A resilient disk 98 is mounted on the bottom face of the leaf spring 92 and is normally resiliently urged against the port seat 78 to normally close the port 76.

Referring now to FIGS. 13 through 15 the further embodiment shown has a valve body 101 with an inner cavity 102 and two flow pipe portions 103 and 104. Pipe portion 103 has a normally-closed port 105 with the port 103 being defined by a raised beveled port seat 106. Pipe portion 104 has a normally-open port 107.

The elongated magnetic core has opposed, parallel, spaced leg portions 112 and 113 and an intermediate leg portion 114 which connect the leg portions 112 and 113 and extend generally transverse thereto. Leg portion 112 terminates in an end face 116 and leg portion 113 terminates in an end face 117. A coil 121 is wound on leg 112 and a coil 122 is wound on leg 113.

A magnetic armature 125 is mounted opposite and spans the end faces 116 and 117 of the core. In particular, a flexible diaphragm 126 connects between armature 125 and the valve body to suspend the armature and close the top of the valve body. A first air gap 127 is formed between end face 116 and an opposite face 128 of the armature and a second air gap 129 is formed between end face 117 and an opposite face 131 of the armature. A coil spring 133 is supported on a base 134 projecting from the intermediate portion 114 toward the armature to resiliently urge or bias the armature to a port-closed position. A resilient disk 135 is mounted on the armature opposite the spring and is urged against the seat 106 to close the port 105. Energization of the coils pulls the armature against the end faces 116 and 117 to open the port 105. In all of the above described embodiments the cross-sectional area of the armature and that of the core is approximately the same.

Although the present invention has been described with a certain degree of particularity, it is understood that the present disclosure has been made by way of example and that changes in details of structure may be made without departing from the spirit thereof.

What is claimed is:

1. An electromagnetic fluid control valve comprising:

a valve body having at least first and second ports through which a fluid is selectively passed in flowing via said body, and electromagnetic actuating means for selectively controlling the fluid flow through said ports, said actuating means including an elongated magnetic core including spaced, oppositely disposed first and second leg portions connected end to end having first and second end portions, respectively, a coil arranged to produce a magnetic flux in said core in a first coil mode and no magnetic flux in a second coil mode, a movable magnetic armature spanning said first and second end portions and forming with said core a single substantially closed-loop magnetic path of magnetic material, said core, coil and magnetic armature forming a single series magnetic circuit including said single magnetic path so that the magnetic flux produced by said coil is confined to said single magnetic path, one of said first and second end portions having a first face, the cross sectional area of said core defining said first face being substantially uniform a substantial distance inwardly along said core from said first face so that said core does not enlarge in cross section as the core approaches said first face, said armature having a second face opposite said first face to define an air gap, said second face substantially conforming at least in size and shape with said first face, the cross sectional areas of said first and second faces being selected to confine the lines of magnetic flux in a minimum cross sectional area of core and armature material to provide a high flux density in the core and armature, said high flux density maximizing the lifting force applied to the armature for a minimum cross section of core and armature material, said minimum cross section of the core and armature minimizing the mass of the core and armature, and the combination of maximum lifting force and minimum armature mass maximizing the switching speed of said armature, said armature being movable between a first armature position wherein said first and second faces defining said air gap in said magnetic path of a preselected length in the direction of magnetic flux flow and a second armature position, one of said first and second armature positions having said armature in a biased engagement with a valve seat to close off flow through said ports in one of said coil modes and moved to said second armature position allowing flow through said ports in the other of said coil modes.

2. A valve as set froth in claim 1 wherein said first and second faces provide high permeability interfaces perpendicular to the direction of magnetic flux flow at both ends of the air gap so as to provide high flux density across the air gap so as to minimize armature travel time.

3. A valve as set forth in claim 1 wherein the length of said air gap is substantially one-fourth the diameter of a closable one of said ports to maximize the force across said air gap and minimize armature travel distance while not restricting fluid flow through said ports when the armature is in said second position.

4. A valve as set forth in claim 1 wherein said first port is a normally-closed port and said second port is a normally-open port, and in said first armature position said first port is closed when said coil is in said second coil mode.

5. A valve as set forth in claim 2 wherein an electromagnetic force exerted on said armature in said first coil mode moves said armature to said second armature position and a biasing means moves said armature to said first armature position during said second coil mode.

6. A valve as set forth in claim 1 wherein said coil is wound on one of said first and second leg portions.

7. A valve as set forth in claim 1 wherein said armature is pivotally mounted to said end portion of said core not having said first face.

8. A valve as set forth in claim 7 wherein said end portion pivotally supporting said armature has an arcuate end face and said armature has a complimentary shaped arcuate recess receiving said arcuate end face to form a hinge joint for said armature.

9. A valve as set forth in claim 8 further including biasing means opposite said armature to resiliently urge said arcuate recess against said arcuate end face.

10. A valve as set forth in claim 1 including a resilient disk carried by said armature that is urged against a raised valve seat defining one of said ports inside said valve body to close the associated port.

11. A valve as set forth in claim 1 wherein said valve body has a third port which normally enables fluid flow through said third port and one of said first and second ports, said third port being closed by the movement of said armature during said first coil mode.

12. A valve as set forth in claim 1 wherein said first and second end portions have first and second end faces and there are opposed faces on said armature to define two air gaps in said magnetic path substantially conforming with said first and second end faces.

13. A valve as set forth in claim 12 wherein said armature is mounted on a non-magnetic leaf spring that biases said armature in one of said first and second armature positions and allows movement of said armature to the other of said armature positions.

14. A valve as set forth in claim 1 including an intermediate leg portion connecting said first and second leg portion and wherein said coil is wound on said intermediate leg portion.

15. A valve as set forth in claim 14 wherein one of said first and second leg portions have a first leg section parallel to the other of said leg portions, a second leg section perpendicular to the other of said leg portions and a third leg section parallel to the other of said leg portions, said third leg portion having said second face.

16. A valve as set forth in claim 12 wherein said armature is resiliently supported along the edges by a flexible diaphragm to move against said end faces of said core in one of said armature positions and is resiliently urged away from said end faces by said diaphragm to define two air gaps in the other of said armature positions.

17. A valve as set forth in claim 15 wherein a coil is wound on each of said first and second leg portions.

18. A valve as set forth in claim 16 including biasing means on a support between said leg portions to urge said armature away from said end faces of said core.

19. An electromagnetic fluid control valve comprising:

a valve body having at least a normally-closed port and a normally-open port through which a fluid is selectively passed in flowing via said body, and electromagnetic actuating means for selectively controlling the fluid flow through said ports, said actuating means including an elongated magnetic core including spaced, oppositely disposed first and second leg portions having first and second end portions, respectively, and an intermediate leg portion connecting said first and second leg portion send to end and extending transverse thereto, a coil arranged to produce a magnetic flux in said core, a movable magnetic armature spanning said first and second end portions and forming with said core a substantially closed loop magnetic path of magnetic material, said core, coil and magnetic armature forming a single series magnetic circuit including said single magnetic path so that the magnetic flux produced by said coil is confined to said single magnetic path, one of said first and second end portions having a first face, the cross sectional area of said core defining said first face being substantially uniform a substantial distance inwardly along said core from said first face so that said core does not enlarge in cross section as the core approaches said first face, said armature having a second face opposite said first face to define an air gap, said second face substantially conforming at least in size and shape with said first face, the cross sectional areas of said first and second faces being selected to confine the lines of magnetic flux in a minimum cross sectional area of core and armature material to provide a high flux density in the core and armature, said high flux density maximizing the lifting force applied to the armature for a minimum cross section of core and armature material, said minimum cross section of the core and armature minimizing the mass of the core and armature, and the combination of maximum lifting force and minimum armature mass maximizing the switching speed of said armature, said armature being movable between a closed-port position wherein said first and second faces defining said air gap in said magnetic path of a preselected length in the direction of magnetic flux flow and an open-port position, the length of said air gap being substantially one-fourth the diameter of said normally-closed port to maximize the force across said air gap and minimize armature travel distance while not restricting fluid flow through said ports when in said open-port position, said armature being in a normally-biased engagement with a valve seat defining said normally-closed port in said closed-port position to close off flow through said ports when said coil is deenergized and moved to said open-port position allowing flow through said ports when said coil is energized.

20. An electromagnetic fluid control valve comprising:

a valve body having at least a normally-closed port and a normally-open port through which a fluid is selectively passed in flowing via said body, and electromagnetic actuating means for selectively controlling the fluid flow through said ports, said actuating means including an elongated magnetic core including spaced, oppositely disposed first and second leg portions connected end to end having first and second end portions, respectively, and an intermediate leg portion connecting said first and second leg portions and extending transverse thereto, one of said first and second leg portions having a first leg section parallel to the other of said leg portions, a second leg section perpendicular to the other of said leg portions and a third leg section parallel to the other of said leg portions, said third leg portion having said second end portion, a coil wound on said intermediate leg portion to produce a magnetic flux in said core, a movable magnetic armature spanning said first and second end portions and forming with said core a single substantially closed loop magnetic path of magnetic material, said core, coil and magnetic armature forming a single series magnetic circuit including said single magnetic path so that the magnetic flux produced by said coil is confined to said single magnetic path, said first and second end portions having first and second faces, the cross sectional area of said cores defining said first and second faces being substantially uniform a substantial distance inwardly along said core from associated of said first and second faces sot hat said cores do not enlarge in cross section as the associated core approaches associated of said first and second faces, said armature having two armature faces opposite said first and second faces to define two air gaps, said armature faces substantially conforming at least in size and shape with said opposite said first and second faces, the cross sectional areas of said first and second faces being selected to confine the lines of magnetic flux in a minimum cross sectional area of core and armature material to provide a high flux density in the core and armature, said high flux density maximizing the lifting force applied to the armature for a minimum cross section of core and armature material, said minimum cross section of the core and armature minimizing the mass of the core and armature, and the combination of maximum lifting force and minimum armature mass maximizing the switching speed of said armature, said armature being movable between a closed-port position and an open-port position, the length of said air gaps being substantially one-fourth the diameter of said normally-closed port to maximize the force across said air gaps and minimize armature travel distance while not restricting fluid flow through said ports when in said open-port position, said armature being mounted on a non-magnetic leaf spring that biases said armature in engagement with a valve seat defining said normally-closed port in said closed-port position to close off flow through said ports when said coil is deenergized and moved to said open-port position allowing flow through said ports when said coil is energized.

21. An electromagnetic fluid control valve comprising:

a valve body having at least a normally-closed port and a normally-open port through which a fluid is selectively passed in flowing via said body, and electromagnetic actuating means for selectively controlling the fluid flow through said ports, said actuating means including an elongated magnetic core including spaced, oppositely disposed first and second leg portions connected end to end having first and second end portions, respectively, and an intermediate leg portion connecting said first and second leg portions and extending transverse thereto, a coil wound on each of said first and second leg portions to produce a magnetic flux in said core, a movable magnetic armature spanning said first and second end portions and forming with said core a single substantially closed loop magnetic path of magnetic material, said core, coil and magnetic armature forming a single series magnetic circuit including said single magnetic path so that the magnetic flux produced by said coil is confined to said single magnetic path, said first and second end portions having first and second end faces, the cross sectional area of said cores defining said first and second end faces being substantially uniform a substantial distance inwardly along said core from associated of said first and second end faces so that said cores do not enlarge in cross section as the associated core approaches associated of said first and second end faces, said armature having a second face opposite said first end face, said second face substantially conforming at least in size and shape with said first end face, the cross sectional areas of said first and second end faces being selected to confine the lines of magnetic flux in a minimum cross sectional area of core and armature material to provide a high flux density in the core and armature, said high flux density maximizing the lifting force applied to the armature for a minimum cross section of core and armature material, said minimum cross section of the core and armature minimizing the mass of the core and armature, and the combination of maximum lifting force and minimum armature mass maximizing the switching speed of said armature, said armature being movable between a closed-port position wherein said first and second end faces define an air gap in said magnetic path of a preselected length in the direction of magnetic flux flow and an open-port position, the length of said air gap being substantially one-fourth the diameter of said normally-closed port to maximize the force across said air gap and minimize armature travel distance while not restricting fluid flow through said ports when in said open-port position, said armature being in a normally-biased engagement with a valve seat defining said normally-closed port in said closed-port position by a biasing means on a support between said leg portions to urge said armature away from said end faces of said core whereby to close off flow through said ports when said coil is deenergized and moved to said open-port position allowing flow through said ports when said coil is energized, said armature being resiliently supported along the edges by a flexible diaphragm to move against said end faces of said core in one of said armature positions and is resiliently urged away from said end faces by said diaphragm to define two air gaps in the other of said armature positions.

* * * * *

UNITED STATES PATENT AND TRADEMARK OFFICE
CERTIFICATE OF CORRECTION

PATENT NO. : 5,139,226
DATED : August 18, 1992
INVENTOR(S) : David L. Baldwin and Steven D. Kaplan It is certified that error appears in the above-identified patent and that said Letters Patent is hereby corrected as shown below:

Col. 6 line 59 change "froth" to --forth--.

Col. 8 line 11 change "portion send" to --portions end--.

Col. 9 line 35 change "sot hat" to --so that--.

Signed and Sealed this

Thirty-first Day of August, 1993

Attest:

BRUCE LEHMAN

Attesting Officer    Commissioner of Patents and Trademarks